(12) United States Patent
Niederl

(10) Patent No.: US 9,350,052 B2
(45) Date of Patent: May 24, 2016

(54) BATTERY SYSTEM

(71) Applicant: AVL List GmbH, Graz (AT)

(72) Inventor: Dietmar Niederl, Jagerberg (AT)

(73) Assignee: AVL List GmbH, Graz (AT)

( * ) Notice: Subject to any disclaimer, the term of this patent is extended or adjusted under 35 U.S.C. 154(b) by 134 days.

(21) Appl. No.: 14/356,350

(22) PCT Filed: Nov. 2, 2012

(86) PCT No.: PCT/EP2012/071706
§ 371 (c)(1),
(2) Date: May 5, 2014

(87) PCT Pub. No.: WO2013/064623
PCT Pub. Date: May 10, 2013

(65) Prior Publication Data
US 2014/0308546 A1    Oct. 16, 2014

(30) Foreign Application Priority Data

Nov. 3, 2011  (AT) ................................ A 1622/2011

(51) Int. Cl.
| | |
|---|---|
| *H01M 10/42* | (2006.01) |
| *H02H 7/18* | (2006.01) |
| *H02H 3/05* | (2006.01) |
| *H02H 3/087* | (2006.01) |

(52) U.S. Cl.
CPC ............ *H01M 10/4257* (2013.01); *H02H 7/18* (2013.01); *H02H 3/05* (2013.01); *H02H 3/087* (2013.01)

(58) Field of Classification Search
CPC ....... H01M 10/4257; H01H 7/18; H02H 3/05; H02H 3/087
See application file for complete search history.

(56) References Cited

U.S. PATENT DOCUMENTS 6,008,627 A     12/1999 Narita
2010/0127663 A1* 5/2010 Furukawa ............. B60L 3/0046
                                                                      320/134

FOREIGN PATENT DOCUMENTS

DE    10 2009 053712 A1   6/2010
DE       102009053712    *  6/2010  ............... H02H 7/18

* cited by examiner

*Primary Examiner* — Patrick Ryan
*Assistant Examiner* — Aaron Greso
(74) *Attorney, Agent, or Firm* — Jordan IP Law, LLC; Todd A. Vaughn

(57) ABSTRACT

A battery system having a battery, an overcurrent switch-off device in which a first current range with a maximum switchable current, and a second switch-off current range having a minimum switchable current. The maximum switchable current of the first current range and the minimum switchable current of the second current range lie above a maximum current of an operating current range, and the switchable current of the second switch-off current range is at least predominantly greater than the switchable current of the first switch-off current range.

Figure 1:
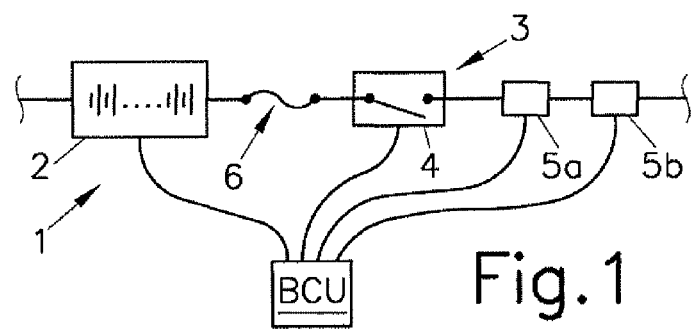

17 Claims, 1 Drawing Sheet ly designed high-voltage paths can lead to extreme thermal loads of the entire system.

BATTERY SYSTEM

CROSS-REFERENCE TO RELATED APPLICATIONS

The present application is a National Stage Application of PCT International Application No. PCT/EP2012/071706 (filed on Nov. 2, 2012), under 35 U.S.C. §371, which claims priority to Austrian Patent Application No. A 1622/2011 (filed on Nov. 3, 2011), which are each hereby incorporated by reference in their respective entireties.

TECHNICAL FIELD

Embodiments relate to a battery system, comprising a battery, especially one having lithium-ion cells, an overcurrent switch-off device, wherein at least one fuse and at least one switching relay are electrically connected in series, and at least one current sensor for detecting the battery current, wherein the switching relay has a first switch-off current range with a maximum switchable current, and the fuse has a second switch-off current range having a minimum switchable current, wherein the maximum switchable current of the first current range and the minimum switchable current of the second current range lie above a maximum current of an operating current range, and wherein the switchable currents of the second switch-off current range are at least predominantly greater than the switchable currents of the first switch-off current range.

BACKGROUND

It is known to perform switch-off of the overcurrent only by opening a main relay. Furthermore, a fuse is often installed in the high-voltage path which is to provide redundant protection against overcurrent and in the case of short circuits.

Such a battery system is known from Japanese Patent Publication No. JP 2008-193 776 A1, for example. The battery system comprises battery blocks which are connected in series via a fuse. In addition, the battery system comprises relays which are connected to the output side of the battery. In this battery system, the fuse will blow out and switch off the current in the battery when an excessive current flows into the driving battery. Furthermore, a control circuit which controls the relay switches off the relay for cutting off the current. The control circuit of the battery system is provided with a current detection circuit for detecting the current of the battery, wherein the charging and discharging of the battery is controlled on the basis of the detected current. The current detection circuit detects the current within the normal battery charging and discharging range, e.g. at or beneath 200 A in a battery system of a vehicle. If a higher current than this one flows in the battery, especially when an abnormally high current flows in the battery, the relays are switched to "OFF" in order to interrupt the battery current.

In the case of a defect in the system, either as a result of a short-circuit or an error in the power electronics outside of the battery or by component defects, currents above the normally permitted or specified current range can occur. Fuses used in such battery packs have disadvantageous properties which limit the use for cutting off the overcurrent. Fuses must be able to bear the operating current range without ageing and without blowing out too early. In order to ensure this, the fuse element must be designed accordingly. This leads to a bottom switch-off current limit (minimum switchable current) for fuses. The fuse cannot be made to blow out beneath this bottom switch-off limit. Currents slightly beneath this bottom threshold value can lead to excessive heating and melting of the ambient parts up to the formation of fires.

On the other hand, relays which are available for battery systems of the kind mentioned above have disadvantageous properties in the switch-off capability of the current. As a result of the switch-off of the high current, the contacts can be damaged to such an extent that in the case of reactivation the contact resistance is so bad that overheating of the relay during further operation and therefore a distinct decrease in performance of the entire system may occur. Furthermore, the contact material is distributed in the contact chamber during a switch-off in the high-current range due to the strong arc, which brings the insulation resistance of one contact pole of the relay to the other beneath the permitted threshold. This leads to the likelihood that voltage can be tapped outside of the battery despite the fact that the switching relay is open.

A battery system with a fuse connected to the battery is further known from German Patent Publication No. DE 10 2009 053 712 A1, which fuse will blow out during the flow of excessive current. A relay is further connected to the output side of the battery. An excessive battery current can be detected and the relay can be controlled via a current interruption circuit. The current interruption circuit is connected to a timer section which determines a delay time for the tripping of the relay. The fusing current of the fuse will be set to a lower level for the delay time of the timer section than the maximum interruption current of the relay and higher than the maximum permitted battery, charging and discharging current. In a situation in which the excessive current which is greater than the maximum interruption current of the relay flows through the battery, the fuse will blow out during the timer delay time and the current interruption circuit switches the relay from "ON" to "OFF" when the delay time has expired. The fuse will blow out during the delay time in order to interrupt current at a current which is large enough to fuse the relay contacts. An excessive current which does not allow the fuse to blow out during the delay time would therefore be a current which does not allow the relay contacts to fuse, which is why the relays can be tripped after the delay time.

It is disadvantageous that the level of the excessive current is not detected and that the relay is tripped only after the expiration of the delay time. Although the delay time is only 0.3 seconds, excessive heating of the ambient parts can occur at current strengths which are larger than the maximum operating current strength, but only slightly lower than the tripping current strength for the fuse, as a result of which local thermal overloads cannot be excluded.

SUMMARY

Embodiments relate to a battery system having a simple design which can reliably interrupt or switch-off the battery current without leading to thermal overloads of components.

In accordance with embodiments, the first and the second switch-off current range have an overlapping range, and at least one current sensor is configured to detect current up to the minimum switchable current of the second switch-off current range, preferably up to the maximum switchable current of the first switch-off current range.

It is preferably provided that a second current sensor is arranged in order to detect currents only within the operating current range.

The operating current range is the current range in which operationally normal charging and discharging processes can occur without any time limitations, without thermally overloading components. Currents occur in the overcurrent range however which are greater than the charging and discharging currents of the operating current range. The overcurrent range therefore extends from the maximum permitted current of the overcurrent range up to a short-circuit current. Overcurrents lead to thermal stresses of components, especially when they continue over prolonged periods of time.

The overlapping range can be at least 5%, preferably at least 10% of the first switch-off current range.

In contrast to German Patent Publication No. DE 10 2009 053 712 A1, it is not necessary to wait for a delay time in order to trip the switching relay. The tripping of the switching relay therefore occurs immediately once it has be determined by the battery control unit that the current measured by the current sensor lies within the first switch-off current range but above the maximum operating current range.

The battery current is preferably interrupted by opening the switching relay in the case of currents beneath the minimum switchable current of the second switch-off current range, preferably above the maximum operating current range.

It can further be provided that an opening of the switching relay is prevented in the case of battery currents above the first switch-off current range or above the minimum switchable current of the second switch-off current range. On the other hand, an interruption of the battery current by the fuse is prevented in the case of currents beneath the second switch-off current range.

Since at least one of the current sensors has the ability to carry out measurements at least up to the beginning of the overlapping range, it can be determined directly whether or not the switching relay can be actuated. It is then decided on the basis of the current measurement whether the switching relay remains closed (when the measuring current is higher than switching current of the relay) or whether it can be opened (since the measured current is lower than the maximum switchable current of the relay) and interrupts the electric circuit.

If the current is permanently too high, the fuse will interrupted the electric circuit. It can thus be recognized subsequently by the current measurement that the current is lower than the maximum switchable current of the relay and therefore the relay can be opened again.

DRAWINGS

The invention is explained below in closer detail by reference to the drawings, wherein:

FIG. 1 schematically illustrates a battery system in accordance with.

Figure 2:
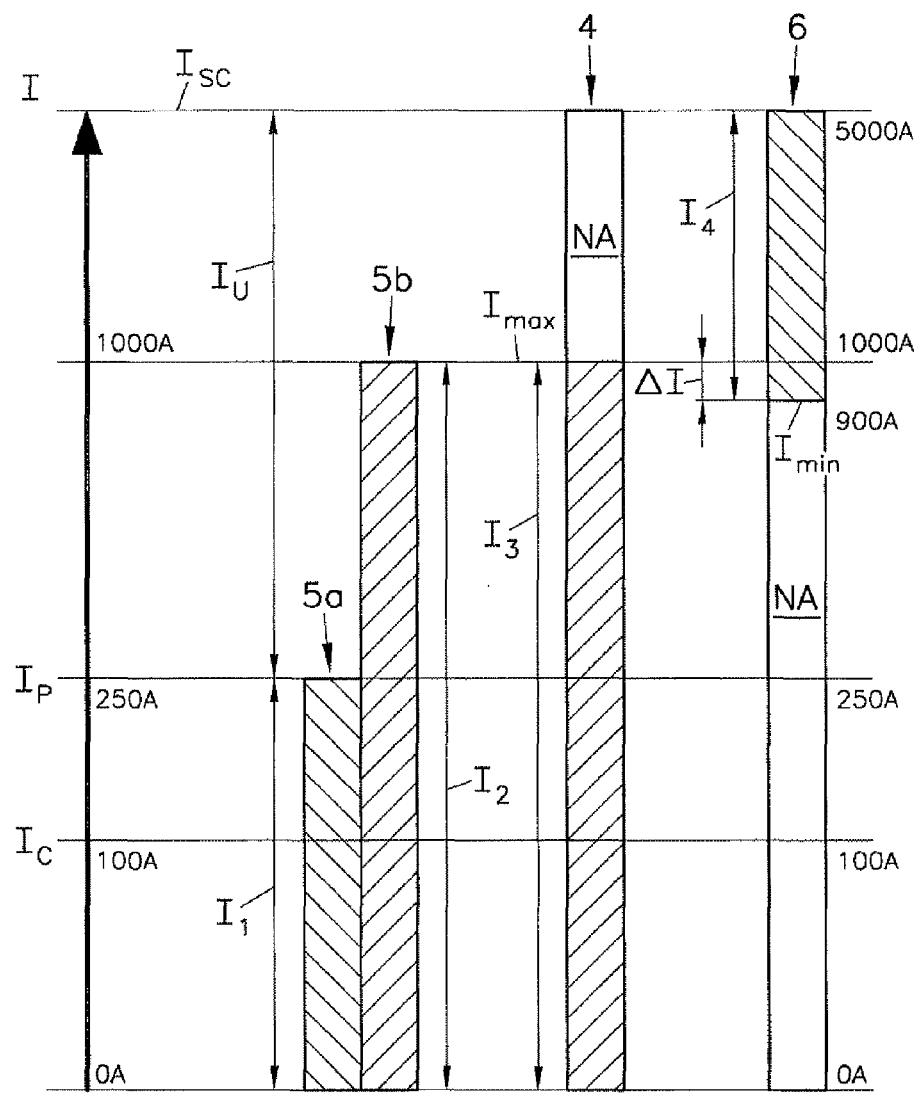

FIG. 2 shows operating ranges for the overcurrent switch-off device of the battery system in accordance with embodiments.

DESCRIPTION

As illustrated in FIGS. 1 and 2, in accordance with embodiments, the battery system 1 comprises a rechargeable battery 2, e.g., a lithium-ion storage battery, an overcurrent switch-off device 3 with a switching relay 4, a first current sensor 5a, a second current sensor 5b, and a fuse 6 arranged as a fusible cutout. The battery 2, the switching relay 4 and the current sensors 5a, 5b are in connection with a battery control unit BCU. The switching relay 4 has a first switch-off current range I3, within which the switching relay 4 can be switched at least once in a failsafe manner, so that the insulation resistance of the switching relay 4 is in a sufficiently high range.

The two current sensors 5a, 5b have different measuring ranges. The first current sensor 5a comprises a further measuring range I2 which substantially covers the first switch-off current range I3 of the switching relay 4. The measuring precision of this current sensor 5a need not be very high.

The second current sensor 5b is configured for the operating current range I1 up to the maximum permitted peak current IP. The fuse 6 has a second switch-off current range I4. The second switch-off current range I4 is predominantly higher than the first switch of range I3 at higher currents I, wherein the first switch-off current range I3 and the second switch-off current range I4 have an overlapping range ΔI. IC designates a continuous operating current, in which operation unlimited in time is possible without any thermal overloading of components.

IU designates an overcurrent range which extends above the operating range I1 up to the short-circuit current Isc. NA designates non-switchable current ranges in FIG. 2 for the switching relay 4 and the fuse 6.

The first current sensor 5a offers the ability to measure up to the overlapping range ΔI. It is decided on the basis of the measurement of the first current sensor 5a whether the switching relay 4 remains closed or whether it is opened. The switching relay 4 always remains closed when the current I lies above the measuring range of the first current sensor 5a, because in this case the current I is too high for the switchable relay 4. If the current I lies in the overcurrent range IU but is beneath the maximum switchable current Imax of the switching relay 4, the switching relay 4 can be used for interrupting the current I and can be opened.

If on the other hand the current I is permanently higher than the maximum current Imax which is switchable by the switching relay 4, the fuse 6 will interrupt the electric circuit by melting. Subsequently, the switching relay 4 can also be opened for additional security if it is recognized by one of the current sensors 5a, 5b that the current lies beneath the maximum switchable current Imax of the switching relay 4.

Switching relay 4 and the fuse 6 must be configured concerning their property of the switch-off capability that they have a specific overlapping range ΔI. In the example shown in FIG. 2, the switching relay 4 has a switch-off capability in the first switch-off current range I3 of between 0 A and 1000 A, and the fuse has a second switch-off current range I4 of approximately 900 A up to the short-circuit current ISC. The first current sensor 5a must be able to measure the current I up to approximately 1000 A, wherein coarse resolution is sufficient.

In an overcurrent situation, the current I up to 1000 A is measured by the first current sensor 5a. If the rise in the current remains beneath 1000 A, the switching relay 4 is tripped and the electric circuit is thus interrupted. If the current I rises beyond the measuring range I2 of the second current sensor or lies above the minimum switchable current Imin of the fuse 6, the switching relay 4 remains closed until the fuse 6 disconnects the electric circuit.

It is thus ensured that all current steps from 0 A up to the short-circuit current ISC are securely disconnected from the components without leading to any damage to the system.

What is claimed is:

1. A battery system, comprising:
    a battery having lithium-ion cells;
    an overcurrent switch-off device with at least one switching relay having a first switch-off current range with a maximum switchable current;
    at least one fuse connected in series to the at least one switching relay, the at least one fuse having a second switch-off current range with a minimum switchable current, the switchable current of the second switch-off current range being greater than the switchable current of the first switch-off current range, the first switch-off current range and the second switch-off current range having an overlapping range; and
a first current sensor to detect current from the battery,
wherein:
the maximum switchable current of the first current range and the minimum switchable current of the second current range are greater than a maximum current of an operating current range,
the first current sensor is configured to detect current at least up to the minimum switchable current of the second switch-off.

2. The battery system of claim 1, further comprising a second current sensor to detect current only within the operating current range.

3. The battery system of claim 1, wherein the overlapping current range is at least 5% of the first switch-off current range.

4. The battery system of claim 1, wherein the overlapping current range is at least 10% of the first switch-off current range.

5. A battery system, comprising:
a battery;
an overcurrent switch-off device connected to the battery and having a switching relay with a first switch-off current range having a maximum switchable current;
a fuse connected to the switching relay and having a second switch-off current range that overlaps the first switch-off current range, the second switch-off current range having a minimum switchable current, a switchable current of the second switch-off current range being greater than a switchable current of the first switch-off current range; and
a first current sensor and a second current sensor to detect current from the battery,
wherein:
the first current range and the second current range have an overlapping current range,
the maximum switchable current of the first current range and the minimum switchable current of the second current range are greater than a maximum current of an operating current range,
the first current sensor is to detect current at least up to the minimum switchable current of the second switch-off.

6. The battery system of claim 5, wherein the second current sensor is to detect current only within the operating current range.

7. The battery system of claim 5, wherein the overlapping current range is at least 5% of the first switch-off current range.

8. The battery system of claim 5, wherein the overlapping current range is at least 10% of the first switch-off current range.

9. A method for switching off batteries in a battery system, comprising:
providing a battery, an overcurrent switch-off device connected to the battery and having a switching relay with a first switch-off current range having a maximum switchable current, a fuse connected to the switching relay and having a second switch-off current range that overlaps the first switch-off current range, the second switch-off current range having a minimum switchable current, a switchable current of the second switch-off current range being greater than a switchable current of the first switch-off current range, wherein the maximum switchable current of the first current range and the minimum switchable current of the second current range are greater than a maximum current of an operating current range;
measuring the current from the battery; and
interrupting, via the fuse, the current from the battery based upon the measured current.

10. The method of claim 9, wherein interrupting the current from the battery comprises opening the switching relay at current within the first switch-off current range and above the maximum operating current range.

11. The method of claim 10, wherein opening the switching relay is prevented at current greater than the first switch-off current range.

12. The method of claim 10, wherein opening the switching relay is prevented at current greater than the minimum switchable current of the second switch-off current range.

13. A method of claim 10, wherein interrupting the current from the battery is prevented at current below the second switch-off current range.

14. The method of claim 9, wherein interrupting the current from the battery comprises opening the switching relay at current below the minimum switchable current of the second current range.

15. The method of claim 14, wherein opening the switching relay is prevented at current greater than the first switch-off current range.

16. The method of claim 14, wherein opening the switching relay is prevented at current greater than the minimum switchable current of the second switch-off current range.

17. A method of claim 14, wherein interrupting the current from the battery is prevented at current below the second switch-off current range.

* * * * *